ced Nov. 21, 1967

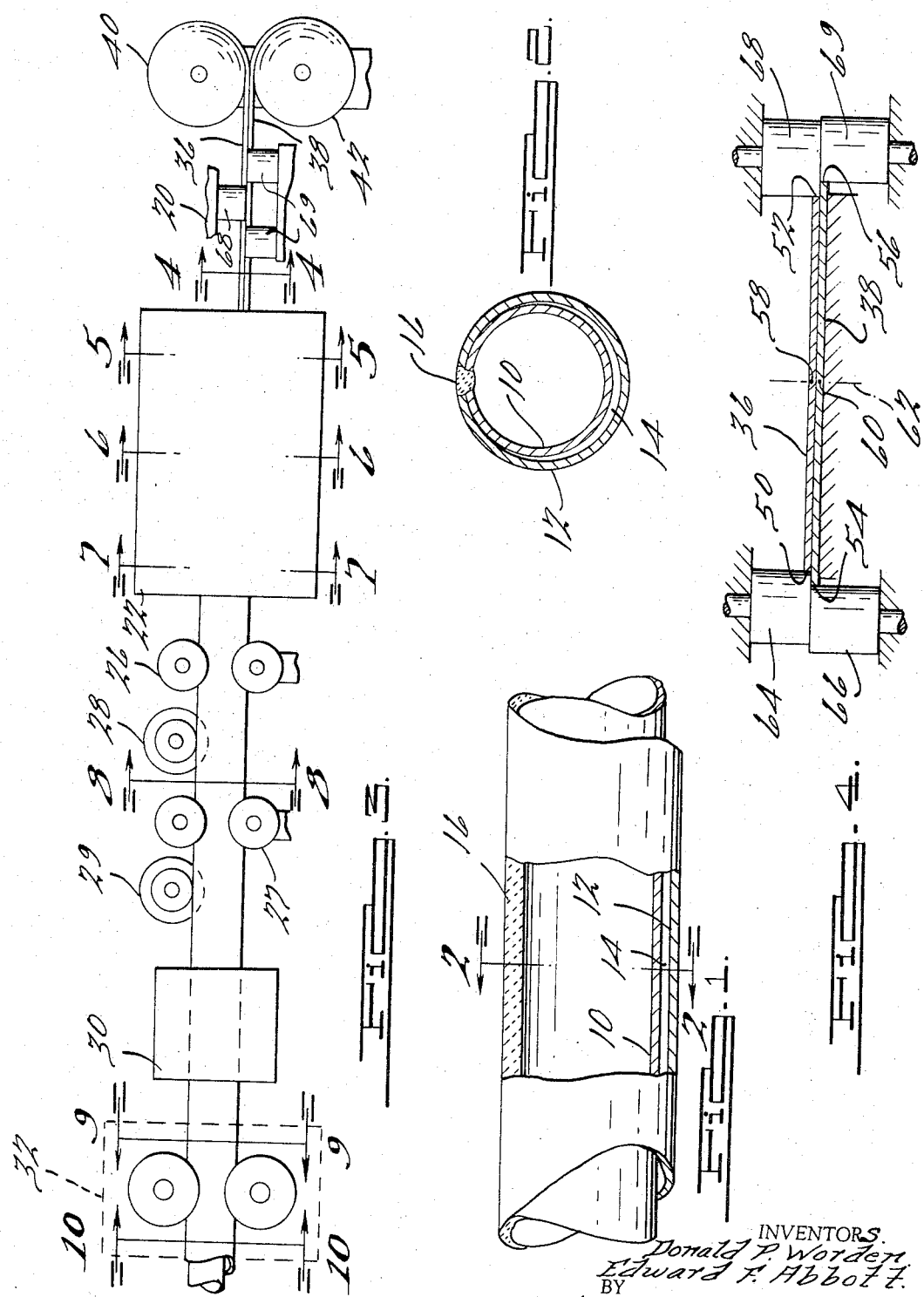

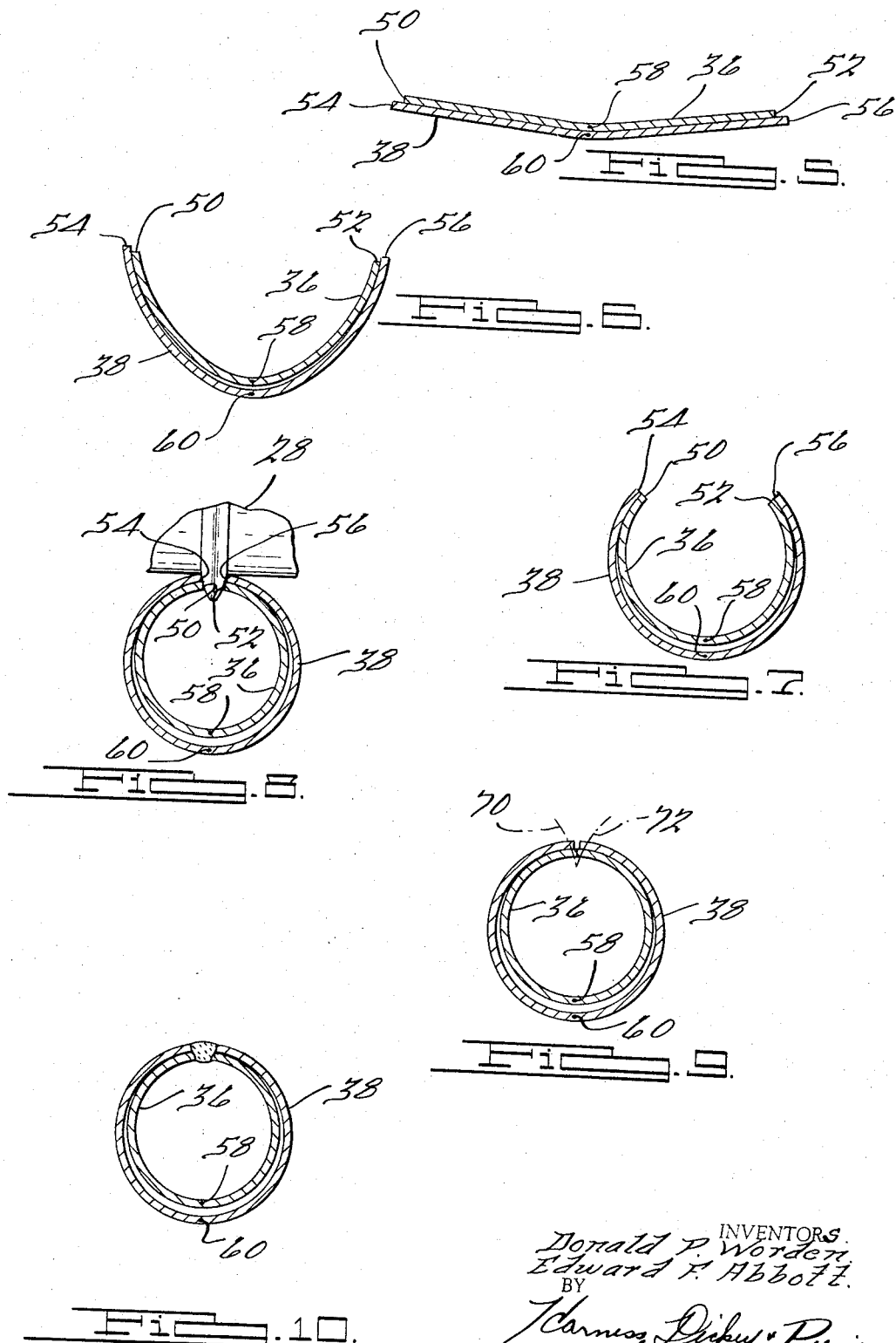

3,354,286
EXHAUST SYSTEM CONDUIT
Donald P. Worden, Racine, Wis., and Edward F. Abbott, Harrisonburg, Va., assignors to Walker Manufacturing Company, Racine, Wis., a corporation of Delaware
Filed Aug. 26, 1963, Ser. No. 304,391
3 Claims. (Cl. 219—8.5)

This invention relates to multi-wall exhaust pipe, particularly for use in automotive exhaust systems and the like, and to the method of manufacturing such pipe.

The use of laminated multi-wall pipe in exhaust systems has been previously suggested. The previously suggested multi-wall or laminated pipe has been formed by telescopically mounting sections of pipe of varying diameters and predetermined lengths. Subsequently the laminated pipe assembly of telescoped sections of pipe is bent into various patterns suitable for use on the various car designs in use. The laminated pipe provides better sound-absorbing qualities and also provides increased wear and life in use.

The use of telescoped pipe sections to form multi-wall pipe has several serious disadvantages and limitations. For example, the laminated pipe is difficult to form and it is relatively expensive. One reason that forming operations are difficult is that the pipes tend to move relative to one another during forming operations. Furthermore, it is desirable to maintain continuous relatively uniform spacing between the pipe walls throughout the length of the pipe assembly. With telescoped pipe sections it is difficult to maintain desired relative positions of the pipe.

Accordingly, it is the primary object of the present invention to provide a new and improved laminated pipe and methods of manufacture thereof.

A feature of the present invention is a multi-wall pipe having the pipe walls intimately joined at a common integral seam.

Another feature of the present invention is the manufacture of multi-wall pipes joined at a common seam on conventional tube-forming mills.

Still another feature of the present invention is the provision of a method of manufacture of multi-wall pipe simultaneously joined at a common weld seam by a single continuous welding operation.

Other features and advantages of the present invention will be apparent to those skilled in the art to which this invention relates by reference to the following detailed description and the accompanying drawing wherein:

FIGURE 1 is a partial sectional view of a length of laminated pipe, with portions removed, embodying the principles of the present invention;

FIGURE 2 is a cross sectional view taken along the line 2—2 in FIG. 1;

FIGURE 3 is a schematic illustration of apparatus in which the laminated pipe shown in FIG. 1 may be made;

FIGURE 4 is a cross sectional view taken along the line 4—4 in FIG. 3 of sheet material stock from which the laminated pipe is made as it enters the tube mill of FIG. 3;

FIGURE 5 is a cross sectional view taken along the line 5—5 in FIG. 3 and showing the initial forming of the sheet material;

FIGURE 6 is a cross sectional view of the sheet material taken along line 6—6 in FIG. 3 and showing a subsequent partially formed condition;

FIGURE 7 is still another cross sectional view of the sheet material taken along line 7—7 in FIG. 3 and showing the sheet material in another subsequently formed condition;

FIGURE 8 is a cross sectional view of the sheet material taken along the line 8—8 in FIG. 3 and showing the formed sheet material prior to the welding operation;

FIGURE 9 is a cross sectional view taken along the line 9—9 in FIG. 3 and showing the formed sheet material at the point of closure after the heating operations; and FIGURE 10 is a cross sectional view taken along the line 10—10 in FIG. 3 and showing the welded sheet material as it leaves the squeeze rolls.

Referring now to FIGS. 1 and 2, the subject laminated pipe assembly is shown to comprise a plurality of wall portions 10, 12 which are formed into tubular shape and separated from one another by a gap 14 around substantially all of the periphery. A common welded joint 16 is provided at which all of the walls of the pipe are joined to one another. Although the laminated pipe is shown to comprise straight wall pipe formed from only two pieces of sheet material, it is to be understood that the scope of this invention is intended to include laminated pipe formed with three or more walls and having various cross sectional configurations and having other than straight lengths.

The pipe of the present invention is preferably formed continuously in a tube mill such as shown schematically in FIG. 3 for purposes of illustration. A suitable mill conventionally comprises a sheet guide portion 20, a set of forming rolls 22, a set of idle rolls 26, 27, a set of fin rolls 28, 29, a weld heater 30 and squeeze rolls 32. Conventionally, sheet material is fed into the forming rolls 22 and formed into a tubular form with the edges of the sheet gradually formed around into closely spaced abutting relationship. The fin rolls maintain the spaced abutting edges in a particular relationship prior to passage through the heater 30. In the heater, the edges of the sheet are heated to the melting point and the edges are abuttingly engaged and welded to one another in the squeeze rolls 32.

In the present invention, flat continuous strips 36, 38 of sheet material for each wall of the laminated pipe to be formed are fed into the forming rolls from coils 40, 42 through special guide means 20 which are adapted to maintain the sheets of material in parallel aligned relationship. The sheets of material are of different widths with the sheet of material forming the inner tubular portions being narrower than the sheet of material forming the outer tubular portions. The sheets of material may be stacked on one another with the widest sheet at the bottom and the narrowest sheet at the top as they are fed into the forming roll portion of the mill. The side edges of the inner sheet of material are equally offset inwardly from the parallel side edges of the wider sheet of material. In other words, the longitudinal centerline of the sheets of material are aligned and each side edge of the upper sheet, or sheets, is inwardly offset relative to the adjacent parallel edge of the lower sheet, or sheets. The amount of the offset should be approximately equal to one-half the difference in width of the sheets for maximum results.

Referring now to FIG. 4, the relationship of the sheets of material to one another is shown in detail. Edges 50, 52 of the upper sheet 36 are spaced inwardly relative to the corresponding edges 54, 56 of the lower sheet 38. The longitudinal centerlines 58, 60 of the sheets are approximately aligned as shown by the dashed line 62 in FIG. 4. The sheets may be aligned in the predetermined manner by suitable side guide rolls 64, 66 and 68, 69 which may be mounted on adjustable slides so that the position of the sheets relative to one another can be adjusted until they are substantially aligned. Although substantial alignment is critical, the sheets of material do not have to be exactly aligned since, surprisingly and unexpectedly, the forming rolls tend to center and maintain the sheets of material centered during the forming operation. The manner of forming of the sheets of material, which lie in abutting relationship as they pass through the tube mill, actually induces forces which tend to keep the sheets exactly centered relative to one another. Consequently, any tendency of the sheets to slide transversely relative to one another and to shift their initially aligned position is completely eliminated in the forming mills and the separating slots formed as the edges of the sheets are turned upwardly and inwardly toward one another tend to remain aligned.

The forming sequence is shown schematically in FIGS. 5–10. In FIG. 5, the sheets have been slightly bent and the offset of the edges 50, 52 relative to the edges 54, 56 has slightly decreased. FIGURE 6 shows the sheets formed about 180° and the offset of the edges 50, 52 relative to the edges 54, 56 has been further decreased. In FIG. 7, the sheets have been formed approximately 270° and the offset of the edges 50, 52 relative to the edges 54, 56 has been substantially eliminated. In FIG. 8, the adjacent edges are again offset relative to one another but are reversely positioned in that the gap between the edges 50 and 52 is now smaller than the gap between the edges 54, 56. The tapered fin pass roll readily accommodates this condition. As the sheets of material pass through the heating unit 30, which may be an induction heating unit for example, the edges are heated to a molten condition within an area adjacent the edges, as indicated generally by the dashed lines 70, 72 in FIG. 9, and the edges are then forced together by the squeeze rolls to form a solid integral continuous weld involving the edges and adjacent surfaces of each sheet of material. As shown in FIG. 10, the external and internal surfaces are slightly upset and may be subsequently smoothed in a conventional manner by a scarfing tool or the like. FIGURES 5–10 are intended to show the formation steps in a general way and it is to be understood that the illustrative relationships shown may vary considerably depending upon the materials being formed, the tube mill equipment being used, and the results desired.

In order to obtain satisfactory results, the side edges or surfaces 50, 52, 54, 56 of the sheets must be positioned and maintained in the manner indicated. The location of the side surfaces of the sheets as they leave the forming rolls and, particularly, just prior to the entrance into the heater means and squeeze rolls is absolutely critical. The opposite side surfaces of each sheet must be aligned and in substantially parallel planes. The adjacent side surfaces of different sheets need not be, and preferably are not in alignment. In other words, at this critical stage of manufacture, the outermost sheet 38 will normally have a slightly wider gap than the next adjacent inner sheet 36. In fact, we have found that the most satisfactory results are obtained when the edges of the sheets have a stepped relationship as shown in FIG. 8. In this position, the offset dimension between the edges 50, 54 and between the edges 52, 56 is preferably in a range of .015 to .020 inch. The exact relationship is extremely critical particularly in the fin rolls whereat substantially greater misalignment of the edges will result in radial inward detction of the edges 50, 52 of the inner sheet 36 or sheets. In order to maintain the edges 50, 52 in the desired relationship in the fin rolls, the idle rolls 26 are adjusted to exert extra pressure until the gap between the edges 50, 52 of the sheet 36 is reduced to approximately .040 to .050 inch. Additionally, the idle rolls 27 are also adjusted to provide increased forming pressure causing approximately an additionally .010 inch reduction in the gap width.

Although it is not known exactly why the slightly stepped relationship of the sheets at the time of entry into the welding heater and the squeeze rolls produces the most satisfactory results, it appears that the edges 54, 56 of the outer sheet 38 are probably heated to a greater extent than the edges 50, 52 of the inner sheet 36 and that the outer edges 54, 56 are capable of greater deflection in the squeeze rolls to form the welds than are the inner sheet or sheets. Therefore, if the edges 50, 52 of the inner sheet are spaced slightly more closely adjacent one another prior to entry of the sheets into the squeeze rolls, the inner sheet will not have to be heated to as great an extent and will not have to be squeezed to as great an extent as the outer sheet to complete the weld. The most satisfactory welds may, therefore, be obtained by slightly overheating the outer edges 54, 56 relative to the inner edges 50, 52 and by slightly oversqueezing the outer edges relative to the inner edges.

In order to properly weld multiple wall tubing, it is not, surprisingly enough, necessary to increase the power requirements in the welding heater unit in proportion to the increase in total wall thickness of sheet material being welded. In other words, whereas in previous sheet welding operations sheet material of, for example, .045 thickness might be satisfactorily welded by a given power input, in the present type of sheet welding operation two sheets of, for example .045 thickness have been found to be capable of being joined at a common seam by a power input far less than expected. It would seem that two sheets of material would require at least twice the power input of one sheet of material. However, by my methods of manufacture an increase in power input in the range of approximately only 20 to 25% is required. In fact, with the aforementioned conditions controlled extremely closely and under ideal welding conditions, the power input requirement may be as low as only an extra 10%. Thus it may be readily seen that multiple wall pipe can be manufactured relatively inexpensively.

In order to calculate exactly how much the different layers of sheet material should vary in width to obtain maximum welding results, a method of calculation has been devised as follows:

$$\text{Outside Strip Width} = \frac{(D+.05)\pi}{\frac{T}{.045}(GF+1.0)}$$

$$\text{Inside Strip Width} = \frac{(D-2T_2+.05)\pi}{\frac{T_2}{.045}(GF+1.0)}$$

where $D$ = Outside diameter of finished pipe.
$T$ = Thickness of the outer wall.
$T_2$ = Thickness of the inner wall.
$GF$ = Growth factor; i.e., the elongation of the width of the strip in the forming operation.

For example, in the manufacture of a 2″ outside diameter 2 layer laminated pipe made from .045 sheet steel stock, the outside layer width and the inside layer width should be as follows:

$$\text{Outside Strip Width} = \frac{(2.0+.05)3.14159}{\frac{.045}{.045}(.023+1.0)} = 6.294$$

$$\text{Inside Strip Width} = \frac{(2.0-.09+.05)3.14159}{\frac{.045}{.045}(.023+1.0)} = 6.010$$

These calculations are intended to be illustrative of my method and have been found to yield relatively accurately results. It will, of course, be understood that various changes in manufacturing conditions may require some adjustment and variation in the calculations to achieve optimum results.

The inventive principles hereinbefore described for illustrative purposes may be otherwise variously applied by reference to the presently preferred embodiments within the intended scope of the appended claims.

The invention claimed is:

1. The method of forming multi-wall pipe or the like from a plurality of separate sheets of material comprising the steps of:

(1) roll forming flat sheet stock into tubular form having a longitudinally extending gap between opposite edges,
(2) aligning the gaps of a plurality of separate telescoped tubular forms,
(3) maintaining a stepped relationship between the edges of inner and outer tubular forms with the inner tubular forms having a narrower gap than the outer tubular forms, and
(4) applying pressure and electrical current to said inner and outer tubular forms to melt said edges and form a common integral joint therebetween.

2. The method of forming multi-wall pipe or the like from a plurality of separate sheets of material comprising the steps of:
(1) roll forming flat sheet stock into tubular form having a longitudinally extending gap between opposite edges,
(2) aligning the gaps of a plurality of separate telescoped tubular forms,
(3) maintaining a stepped relationship between the edges of inner and outer tubular forms with the inner tubular forms having a narrower gap than the outer tubular forms,
(4) applying pressure and electrical current to said inner and outer tubular forms to melt said edges and form a common integral joint therebetween, and
(5) applying higher heat and pressure to said outer tubular form relative to said inner tubular form.

3. The method of manufacturing multi-wall tubular pipe or the like from separate sheets of material of different width comprising the steps of:

(1) aligning the separate sheets of material in closely spaced relationship with the central longitudinal axes extending in parallel alignment,
(2) simultaneously forming the separate sheets of material into tubular forms having the opposite edges of each sheet of material spaced closely adjacent one another and defining a longitudinally extending gap located substantially opposite the central longitudinal axes,
(3) aligning the gaps of each sheet of material with the edges of adjacent sheets of material in a predetermined stepped relationship,
(4) applying electrical current to melt the edges of all of said sheets of material along said gaps, and
(5) applying pressure to the edges of all of said sheets of material along said gaps to form a continuous integral seam between all of said sheets of material.

References Cited

UNITED STATES PATENTS

| | | | |
|---|---|---|---|
| 2,072,273 | 3/1937 | Obert | 29—471.1 |
| 2,164,267 | 6/1939 | Black | 29—477.7 |
| 2,380,107 | 7/1945 | Hobrock | 138—171 |
| 2,754,784 | 7/1956 | Maysmor et al. | 113—33 |
| 2,866,480 | 12/1958 | Snively | 138—171 |
| 3,077,170 | 2/1963 | Parlasco | 113—33 |
| 3,118,045 | 1/1964 | Kohler | 219—59 |

RICHARD J. HERBST, *Primary Examiner.*

LEWIS J. LENNY, *Examiner.*